(No Model.) 2 Sheets—Sheet 1.
W. E. MANN.
RECIPROCATING GANG SAW MILL.
No. 408,807. Patented Aug. 13, 1889.
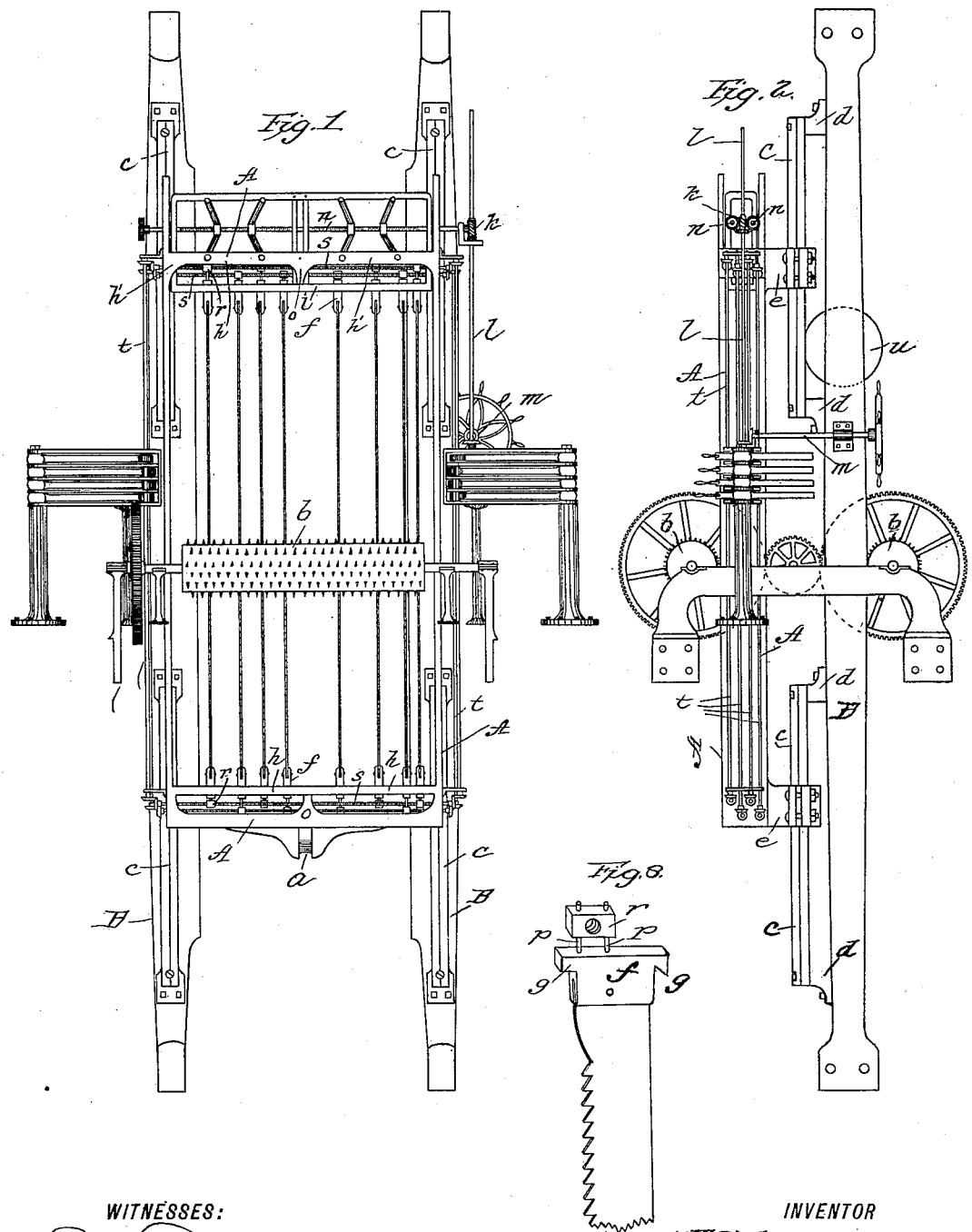
WITNESSES:
INVENTOR
Wm. E. Mann
BY Ellis Spear
ATTORNEY

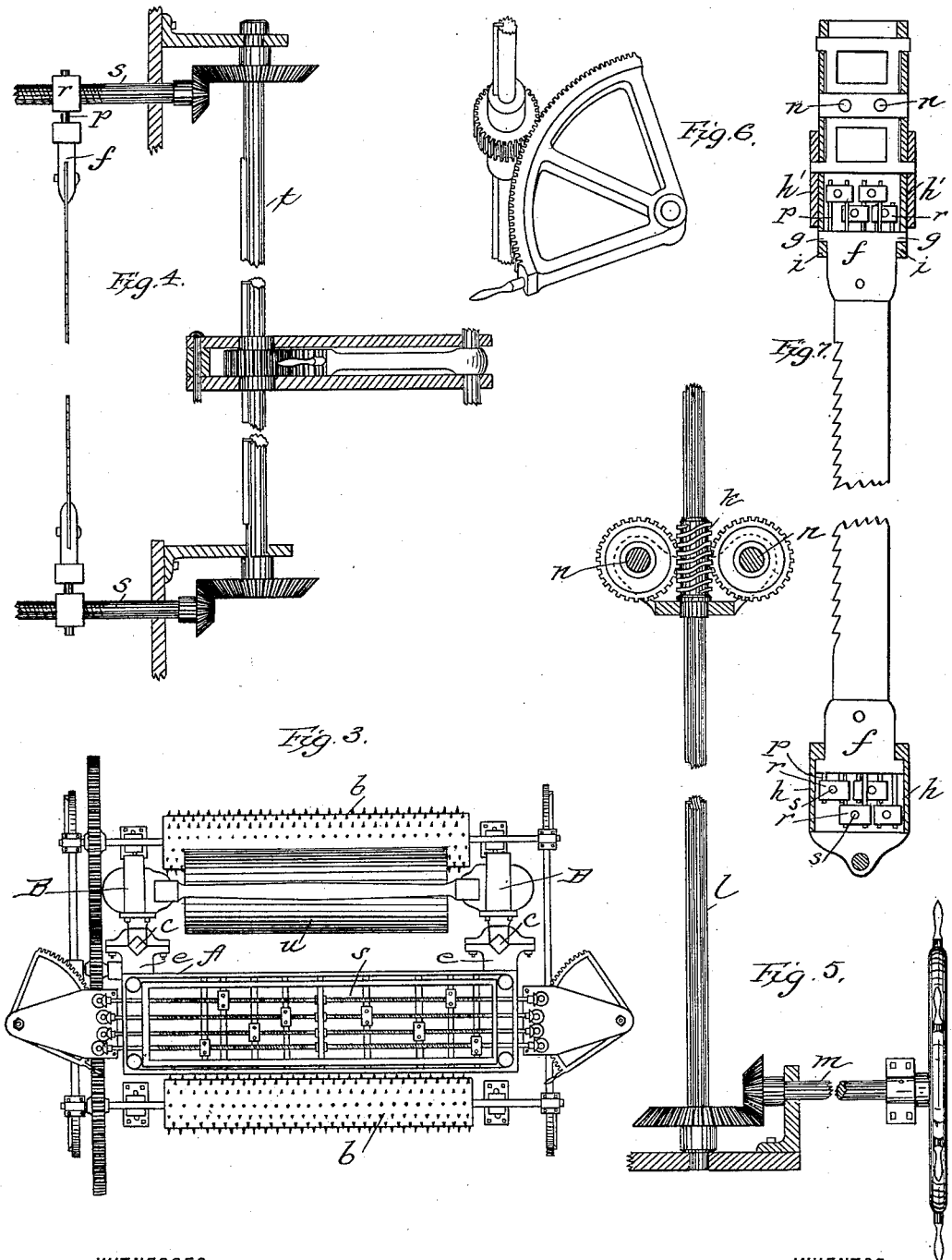

UNITED STATES PATENT OFFICE.

WILLIAM E. MANN, OF BANGOR, MAINE.

RECIPROCATING GANG-SAW MILL.

SPECIFICATION forming part of Letters Patent No. 408,807, dated August 13, 1889.

Application filed August 2, 1888. Serial No. 281,735. (No model.)

*To all whom it may concern:*

Be it known that I, WILLIAM E. MANN, of Bangor, in the county of Penobscot and State of Maine, have invented a new and useful Improvement in Reciprocating Gang - Saw Mills, of which the following, taken in connection with the accompanying drawings, is a specification.

My object is to provide means for adjusting the saws to saw any width of material, which may be operated without stopping the machine, and also to provide a tension for the saws, which may be operated to slacken or tighten them to any extent. I also aim to provide a simple but effective apparatus with means for supporting the saws independently of the devices for operating them, whereby all strain is taken off of the adjusting devices.

The invention, as hereinafter described, consists of the devices and combination of devices set forth in the claims.

In the drawings, Figure 1 is a front elevation of my apparatus. Fig. 2 is a side elevation of the same. Fig. 3 is a plan view, and Figs. 4, 5, 6, 7, and 8 represent enlarged details of the various parts.

The apparatus shown consists of a suitable frame A, which is supported upon standards B B, firmly braced, the said frame having reciprocating vertical movement through an ordinary crank or other suitable connection with a source of power at the point $a$, Fig. 1.

The frame is supported in proper relation to the line of flooring, so that it may reciprocate above and below the same, its center being normally in line with the feed-rolls. Any suitable feed-rolls or device may be used, but in the drawings I have shown simply rollers having toothed surfaces adapted to positively feed the log to the saws. These rollers are shown at $b\ b$, one in front and the other in rear of the saws. Any suitable number may be used according as necessity may require. These rollers may be, as shown, in connection with the driving mechanism through suitable gearing.

From the supports B B are supported ways or guides $c\ c$ at top and bottom of said supports by means of brackets $d\ d$, and arms or projections $e\ e$ on the frame A encircle or embrace these ways, as shown, and, as the ways are only connected at their extreme ends, the frame is thus held in place and allowed to reciprocate evenly and uniformly under the action of the crank or other medium. This reciprocating frame carries the saws or series of saws, which are not only held thereby, but in such a manner as to allow of their lateral adjustment, and of the proper tension being applied, and this without necessitating the stopping of the machine.

As heretofore stated, much better results can be secured both in saving of material and in the accuracy of the work produced by the use of reciprocating saws than by circular saws in sawing dimension lumber; but as this class of lumber requires adjustment of the saws for the different sizes it is necessary that means be provided by which this adjustment can be secured readily and quickly without interfering with the operation of the machine, but also that the tension of the saws may be slackened to allow of such adjustment and the saws again placed under tension after their new position has been reached, this adjustment of the tension being also possible during the operation of the apparatus. I have therefore shown the frame A as being provided with a series or gang of saws. (More or less than the number shown may be used, if desired.) These saws are of ordinary construction and are secured at each end to a head $f$ by rivets, or in any other suitable manner. These heads have projecting ears $g\ g$, which bear against the under surface of the cross-rails $h\ h$ of the lower part of the frame A, thus limiting the upward movement of the saws and at the same time affording a firm support at this end when the saws are under tension.

Cross-plates $h'\ h'$ extend across the upper part of the frame A at front and back, and within these cross-plates and the side walls of the frame is arranged a sliding frame in the shape of a rectangular open box, with its lower side rails $i\ i$ serving to support the upper ends of the saws through the ears in the same manner as before described, except of course that the ears bear against the upper faces of the said rails $i\ i$. From the upper side rails of this sliding frame are supported the upper arms of toggle-levers, and from the side rails or plates $h'\ h'$ of the frame A extend the lower arms of the said levers, the two sets of arms being each connected by internally-screw-threaded blocks mounted on a shaft provided with right and left hand threads, as shown. Four of these moving blocks are shown with their toggles, but more or less may be used. Two of these screw-threaded shafts are provided with blocks and toggles—one for each side of the machine—so that the tension may be uniform. These shafts are operated as follows: They are provided with worm-gears on one end, which mesh with a worm $k$ on the end of a shaft $l$, the worm passing between the gears, so as to mesh with both, as shown clearly in Fig. 5. This shaft $l$ has a beveled gear on its lower end, which meshes with a smaller gear on the end of a band-wheel shaft $m$, and by the operation of this wheel the tension of the saws may be increased or diminished at will, as this action, through the screw-threaded shafts shown at $n\ n$, causes the blocks to travel in one direction or the other to increase or diminish the power of the toggles, and, as one end of each of these toggle-levers is connected to the sliding frame supporting the saws and the other end to the cross-plates of the frame A, it is evident that the saws are either strained or slackened according to the direction of movement of the hand-wheel.

The lateral adjustment of the saws is effected as follows: At the top and bottom of the frame A, just above and below the heads of the saws, are supported right and left hand screw-threaded rods $s$, each rod being thus threaded, as I find it desirable to arrange the gang in two sets—one set adjustable from one side and the other set from the opposite side. One of these rods is provided for each saw, and they have their bearings in the side walls of the frame and a central web $a$, it being understood that each rod extends only from one side of the main frame to the central web. Each rod carries a screw-threaded block $r$, which travels in one direction or the other under the movement of its rod, and connection is made between these blocks and the heads of each saw by means of pins $p$, projecting from the upper and lower faces of the saw-heads, these pins passing through holes made for them in the block $r$. The arrangement of rods and blocks is the same at top and bottom of the frame, and in the movement of the rods the blocks are caused to travel, and thus carry with them the saws, and by reason of the loose connection of the pins with the blocks the adjustment of the tension device may be effected without any disconnection of the saws carried at one end by the moving frame and the blocks $r$ mounted in shafts held in the frame A.

Each of the rods $s$ is provided with a bevel-gear on its end which connects with a corresponding gear on the end of a shaft $t$, which shaft extends between the upper and lower rods of each saw. Each set of rods is connected in the same manner, the rods of one half being connected on one side of the machine and the rods of the other half on the opposite side.

Each of the connecting-rods $t$ is provided with a gear about its center, and each of these gears is in mesh with a hand-wheel or segment thereof, by which the rod may be operated to shift the blocks $r$ along their respective rods, and thus change the relative positions of the saws. I arrange the operating-levers of the connecting-rods $t$ in line with each other, and thread the rods $s$ relatively to the position of the blocks which they carry, so that the same movement of the hand-levers is required whether it is intended to adjust the saw nearest the side of the frame or the one in the center. By this means, should it be desired, after the log has passed through and been cut, to return the same without separating the cut portions, the group of operating-levers on each side may be given a simultaneous movement to one side, and the saws will close up against the sides and leave the center unobstructed.

By arranging the adjusting devices independent of the supports for the saws I secure a very strong construction of parts, and all binding of the moving saws under tension is prevented.

I have shown at $u$ a pressure-roller arranged above the feed-roll, and constituting a part of the feeding apparatus.

The vertical shafts $l$ and $t$ have a feather or spline running their entire length, so as to permit of their movement with the reciprocating frame without disturbing the connection between the said shafts and the gears for operating them.

Having thus described my invention, what I claim is—

1. In combination, the movable frame A, the saws, the supplemental frame supported to have sliding movement in the main frame A, the said saws being supported by said supplemental frame to allow lateral movement thereon, means for moving the saws laterally, and means for moving the supplemental frame, substantially as described.

2. In combination, the reciprocating frame A, the saws carried thereby and supported to have lateral movement, the screw-rods for giving said lateral movement journaled in the frame of the machine, the blocks on said rods having loose or sliding connections with the saws, whereby said saws are allowed longitudinal movement for the adjustment of tension, and means for adjusting the tension of the saws, substantially as described.

3. In combination, the main frame A, the supplemental sliding frame supported thereby, the series of saws, the screw-shaft $n$, the toggle-arms thereon connected to the supplemental frame and the main frame, respectively, and means for rotating the shaft, whereby the whole series of saws may be adjusted simultaneously and evenly by the movement of the supplemental frame, substantially as described.

4. In combination, the reciprocating frame, the series of laterally-movable saws, the screw-rods for moving them, the screw-rod $n$, with connections to the saws for adjusting them longitudinally, a series of levers and wheels for operating all the said screw-rods, a series of connecting-shafts operated thereby and having pinion-connection with the said screw-shafts, whereby the saws may be adjusted both laterally and longitudinally during the reciprocation of the main frame A, substantially as described.

In testimony whereof I have signed my name to this specification, in the presence of two subscribing witnesses, on this 12th day of July, A. D, 1888.

WILLIAM E. MANN.

Witnesses:
F. L. MIDDLETON,
C. H. WELCH.